(12) United States Patent
Temple-Boyer et al.

(10) Patent No.: US 7,009,184 B2
(45) Date of Patent: Mar. 7, 2006

(54) AMPLIFIER DEVICE FOR SENSORS

(75) Inventors: Pierre Temple-Boyer, Monteiscard (FR); Gérard Sarrabayrouse, Mouchan (FR); Augustin Martinez, Toupouse (FR); Jérôme Launay, Belesta (FR)

(73) Assignee: Centre National de la Recherche Scientifique, Paris (FR)

( * ) Notice: Subject to any disclaimer, the term of this patent is extended or adjusted under 35 U.S.C. 154(b) by 0 days.

(21) Appl. No.: 10/220,540

(22) PCT Filed: Mar. 2, 2001

(86) PCT No.: PCT/FR01/00625

§ 371 (c)(1),
(2), (4) Date: Nov. 27, 2002

(87) PCT Pub. No.: WO01/65210

PCT Pub. Date: Sep. 7, 2001

(65) Prior Publication Data

US 2003/0147451 A1      Aug. 7, 2003

(30) Foreign Application Priority Data

Mar. 3, 2000 (FR) .................................. 00 02763

(51) Int. Cl.
*G01D 3/06* (2006.01)

(52) U.S. Cl. ........................... 250/370.14; 250/370.07; 250/214 A

(58) Field of Classification Search ................ 330/308, 330/296, 277, 292; 250/484.5, 214 A, 214 R, 250/214.1, 370.07, 370.01, 370.14, 378; 324/71.4, 123 R, 600, 602, 609, 610
See application file for complete search history.

(56) References Cited

U.S. PATENT DOCUMENTS

| | | | |
|---|---|---|---|
| 4,484,076 A * | 11/1984 | Thomson | 250/370.14 |
| 4,513,616 A | 4/1985 | Bezard et al. | 73/295 |
| 4,788,581 A * | 11/1988 | Knoll et al. | 250/370.14 |
| 4,816,118 A | 3/1989 | Oyama et al. | 204/418 |
| 4,825,383 A | 4/1989 | Ory | 364/509 |
| 4,976,266 A * | 12/1990 | Huffman et al. | 250/370.14 |
| 5,115,188 A | 5/1992 | Norton | 323/365 |
| 5,256,986 A * | 10/1993 | Flocke et al. | 250/214 A |
| 5,739,541 A * | 4/1998 | Kahilainen | 250/370.07 |
| 5,990,745 A * | 11/1999 | Carroll | 250/214 A |
| 6,172,368 B1 * | 1/2001 | Tarr et al. | 250/370.07 |
| 6,229,398 B1 * | 5/2001 | Auric et al. | 330/292 |

* cited by examiner

*Primary Examiner*—Diego Gutierrez
*Assistant Examiner*—Stanley J. Pruchnic, Jr.
(74) *Attorney, Agent, or Firm*—Thelen Reid & Priest LLP

(57) ABSTRACT

An amplifying device for a sensor (10) delivering a response in voltage or impedance has a voltage controlling means for the sensor and at least an additional impedance (12). The voltage controlling means (22) is connected to output terminals (16, 20) of the sensor to maintain a noticeably constant voltage between the terminals. The additional impedance (12) is connected in series with the sensor within a polarization circuit, between the output terminals (18–16; 18–20) of the device. The amplifying device may be applied to temperatures, irradiation levels and pH measurement.

5 Claims, 3 Drawing Sheets

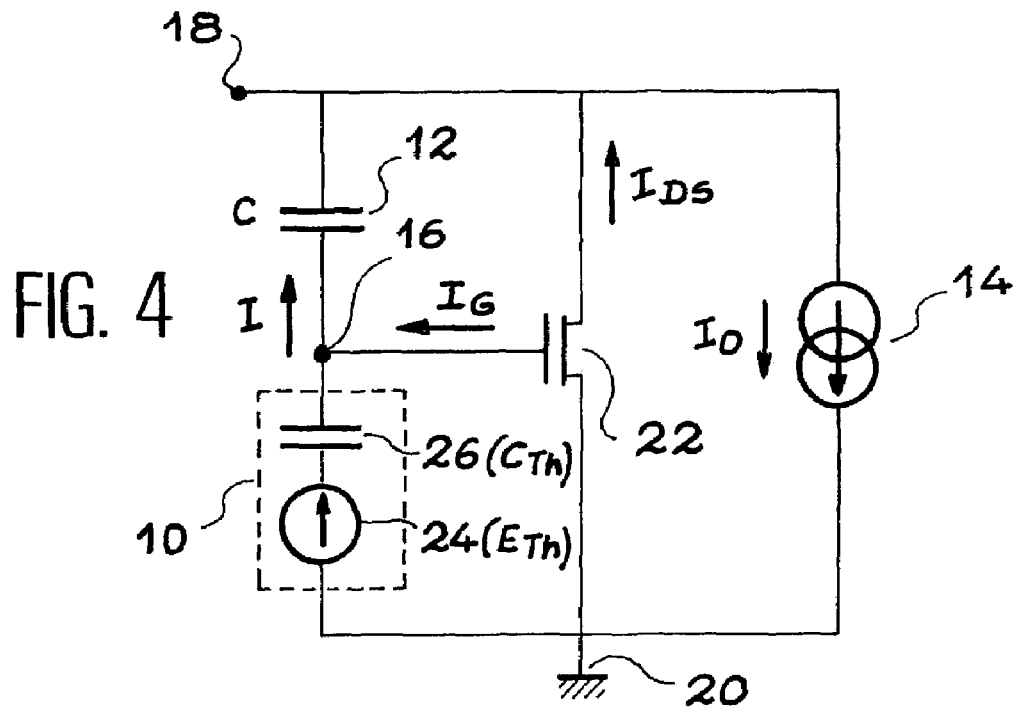
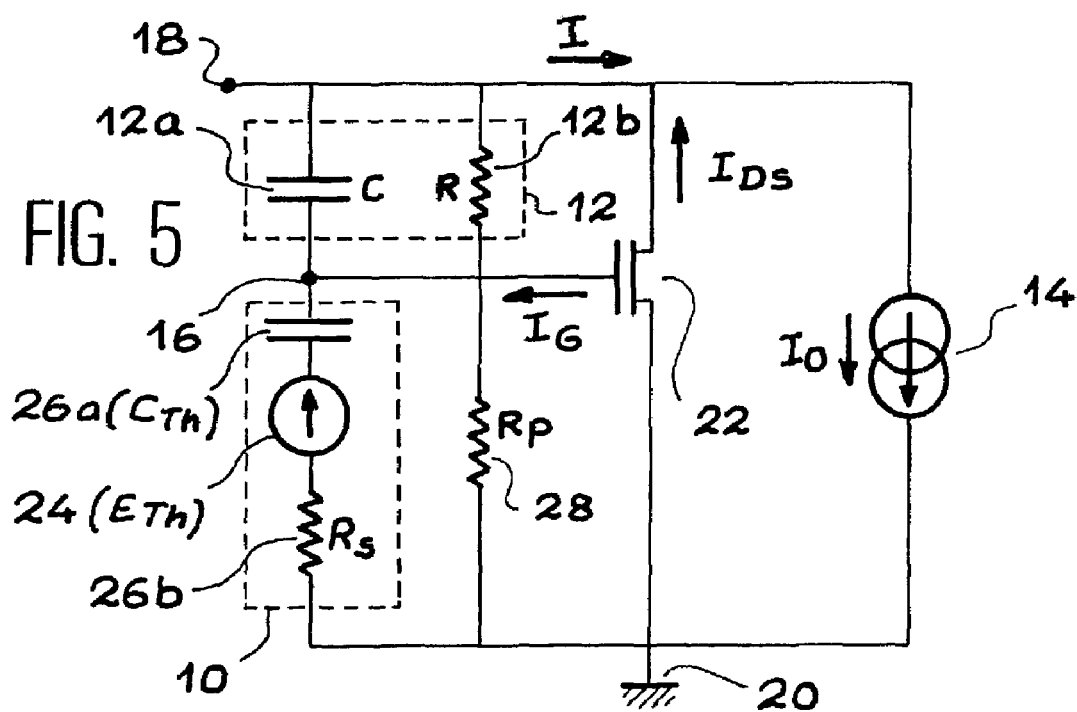

AMPLIFIER DEVICE FOR SENSORS

This application is a national phase of PCT/FR01/00625 which was filed on Mar. 2, 2001, and was not published in English.

DESCRIPTION

1. Field of the Invention

The present invention relates to an amplifying device for sensors and a measuring system for physical quantities using this device.

The device of the invention is intended, in particular, for voltage and/or impedance response sensors. Such a voltage and/or impedance response sensor is a sensor at which terminals one obtains a voltage variation and/or an impedance variation related to the modification of the physical quantity to which the sensor is sensitive.

The invention has applications in the manufacturing of measuring systems, and mainly measuring systems which comprise miniaturised or embedded (integrated) sensors, known as micro-sensors. As an example, in no way restrictive for the use of the device, the invention may apply to the realisation of thermal probes, dosimeters or photometers.

2. Description of the Prior Art

The above mentioned voltage and/or impedance response sensors may be modelled by assuming that they are equivalent to a source of a fixed voltage in series with a variable impedance, or equivalent to a source of a variable voltage in series with a fixed impedance, or equivalent to a source of a variable voltage in series with a variable impedance.

By letting $E_{Th}$ and $Z_{Th}$ be the voltage and impedance values featured by the sensor, and X a physical quantity to which the sensor is sensitive, one may define the voltage sensitivity e, or the impedance sensitivity z of the sensor as:

$$e = dE_{Th}/dX$$

and $$z = dZ_{Th}/dX$$

A sensor whose sensitivity to a physical quantity only affects its impedance may be characterised by $dE_{Th}=0$ and $dZ_{Th}=zdX$. A sensor whose sensitivity to a physical quantity only affects its voltage source may be characterised by $dE_{Th}=edX$ and $dZ_{TH}=0$.

The sensitivity (e and z) of sensors to physical quantities are usually very low. It is especially the case when theses sensors are involved in the detection of secondary physical quantities which are generated by the phenomenon to be observed (temperature measurement by variable resistors, for example).

This low sensitivity of sensors induces a limitation of measurement precision and a strong influence of the measurement noise.

DESCRIPTION OF THE INVENTION

The purpose of the invention is to present an amplifying device for the sensors and a measurement system which discards the above mentioned limitations.

One particular purpose of the invention is to propose an amplifying device allowing to yield a measurement signal at terminals of an additional impedance distinct from the sensor.

One object of the invention is also to propose a measuring system whose sensitivity to the physical quantities to be measured is widely increased.

One object of the invention is also to propose a system which features a good measuring precision, which is immune to noise and thus permits a reduction of detection thresholds.

To fulfil these objectives, the object of the invention is an amplifier for a voltage and/or impedance response sensor. The device includes:

- voltage control means, connected to the sensor output terminals to maintain a noticeably constant voltage between these terminals,
- at least one additional impedance series connected with the sensor in a polarisation circuit, between the terminals of the said device.

Through the voltage control means, any modification of the equivalent impedance of the sensor or any modification of the voltage delivered by the equivalent voltage source of the sensor yields a modification of the current flow through the sensor. This results from the fact that the voltage at its terminals is forced to be fixed.

As the additional impedance is series connected with the sensor in the polarisation circuit, the sensor current also flows into this impedance. The current modification then appears as a voltage modification at the additional impedance ends.

The additional impedance is connected between output circuit terminals so that the voltage variation at the ends of the additional impedance are included in the output signal.

The output terminals of the device may be, for example, the additional impedance ends or the ends of the assembly including the additional impedance in series with the sensor (the voltage being constant at ends thereof).

Following a particular realisation of the device according to the invention, the voltage control means may include a field effect transistor (FET). The sensor is then connected between the gate and the source of the transistor, whereas the additional impedance is connected between the gate and the drain of the transistor.

The transistor, for example, is a MOS (Metal-Oxide Semiconductor) mounted in common source and preferably polarised in saturation. The application of an large polarisation current maintains a steady state of the gate-source voltage. The polarisation means may for example include a current source connected between the source and the drain of the transistor.

The invention relates also to a measuring system for physical quantities involving a voltage response or impedance response sensor operating with an amplifying device as described above.

Being liable to be realised with any type of voltage and/or impedance sensor, the measuring system may include in particular any one of the following sensors: a thermocouple, a dosimeter, a chemical sensor or a bio-sensor. A bio-sensor is understood as any sensor sensitive to organic species such as ADN, various proteins, bacteria, etc.

Other features and advantages of the invention will be made clearer in the following description, referring to the figures in annex. This description is in no way restrictive with respect to the scope of the invention and gives only an example of the various realisation of the device according to the invention.

BRIEF DESCRIPTION OF THE DRAWINGS

FIGS. 3 to 5 are electric schematics featuring three particular applications of the measuring system following FIG. 2;

DETAILED DESCRIPTIONS OF EMBODIMENTS OF THE INVENTION

In the following description, the elements which are either identical or similar have a same numeric reference.

Figure 1:
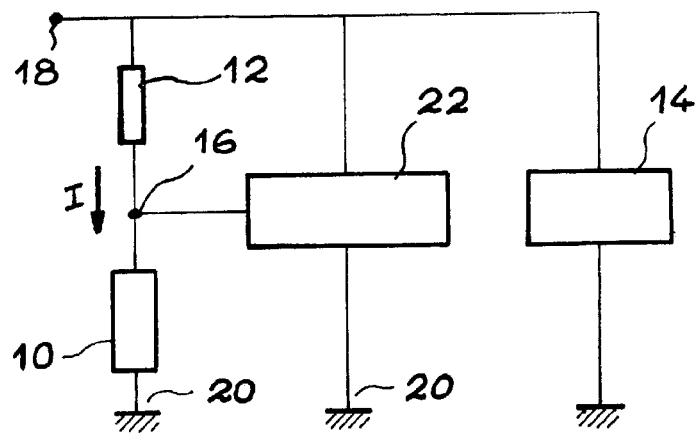
FIG. 1 is a simplified schematic block diagram of a measuring device according to the invention.

FIG. 1 illustrates the general operating principle of the invention.

A sensor 10 and an additional impedance 12 are series connected in a polarisation circuit connected to polarisation means 14. The polarisation means 14 provide sensor 10 and additional impedance 12 with a current noted I on the figure.

The additional impedance 12 is connected between a node 16, which connects it to sensor 10 and an output terminal 18. The sensor 10 is connected between node 16 and a ground terminal 20.

Voltage control means 22 are also connected to node 16. They maintain a constant voltage between the load ends, that is, in the example described on the figure, between node 16 and ground terminal 20.

The input of the device corresponds to the sensor terminals and the output voltage of the device can be picked up at terminals of the additional impedance, that is between node 16 and output terminal 18.

As the voltage at sensor terminals is constant, the output voltage of the device can also be picked up between output terminal 18 and ground terminal 20. This alternative solution is retained in the following.

Figure 2:
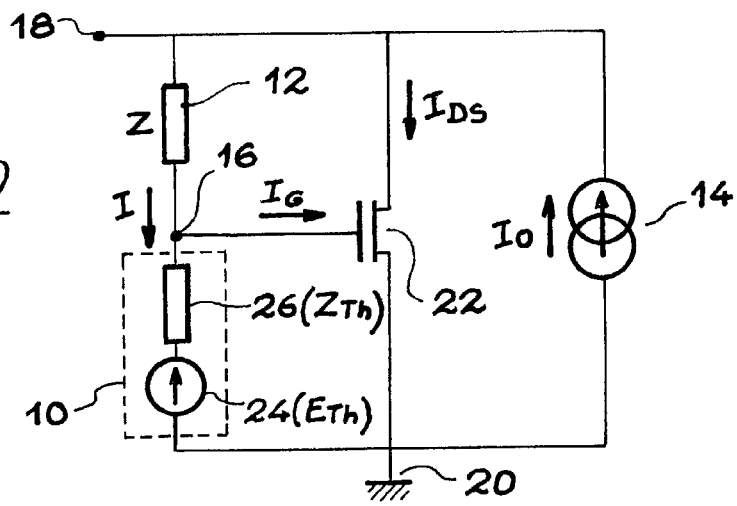
FIG. 2 is an electric schematics showing a possible design of the measuring system which involves a field effect transistor.

FIG. 2 shows a particular embodiment of the measurement system wherein current control means 22 involve an insulated gate field effect transistor (IGFET), for example an N channel MOSFET, and wherein the polarisation means 14 feature a current source. The drain, the source and the gate of transistor 22 are respectively connected to output terminal 18, ground terminal 20 and node 16.

The current source delivers a current, $I_0$, which is split into a first current, $I_{DS}$ which flows through the channel of the transistor, and a second current I which flows through the additional impedance 12. The strong polarisation current involved ($I_0 \gg I$) permits to operate the transistor 22 in saturation and then to fix its gate voltage (here the gate-source voltage) at an equilibrium value which avers practically constant. This value, applied to terminals of the sensor 10, is noted $V_{GSo}$ in the following.

The current I which flows through the additional impedance 12 is noticeably the same as the current which flows into the load 10 in series with the additional impedance. Indeed, the value $I_G$ of a gate current of the transistor which leaves node 16 is extremely low ($I \gg I_G$).

The assembly composed of sensor 10 and additional impedance 12 form a voltage dividing bridge between the drain-source voltage of the transistor, noted $V_{DS}$, and the gate-source voltage.

Besides, the additional impedance 12, whose value is noted Z, connected between the drain and the gate of the transistor 22, acts as a counter-reaction loop, which servo-controls and stabilises the gate-source voltage, that is the voltage at sensor terminals.

One may see, on the figure, that sensor 10 is modelled as an equivalent voltage source 24, whose value is $E_{Th}$, in series with an equivalent impedance 26 whose value is $Z_{Th}$. The figure details these Thevenin's equivalence.

As the voltage $V_{GSo}$ is constant, a variation $dE_{Th}$ or $dZ_{Th}$ of the characteristics $E_{Th}$, $Z_{Th}$ of sensor 10, in response to a variation to be detected of a physical quantity, are transformed into a variation of the current I. These variations, amplified through the additional impedance 12, whose value is Z, are measured as variations $dV_{DS}$ of the drain-source voltage $V_{DS}$ of the transistor.

The variation $dV_{DS}$ can be derived from the variations $dZ_{Th}$ and $dE_{Th}$ via the following relation:

$$dV_{DS} = -(V_{GSo} - E_{Th}) \cdot (Z/Z_{Th}^2) \cdot dZ_{Th} - (Z/Z_{Th}) dE_{Th}$$

For sensors sensitive to a value X only through their equivalent voltage source $E_{Th}$, with a sensitivity value e such as $dE_{Th} = edX$ and $dZ_{Th} = 0$, the circuit is advantageous, in particular when the following condition is satisfied: $|Z/Z_{Th}| > 1$.

This condition permits to obtain an output signal proving a higher amplitude than the signal which should be delivered by the sensor alone.

In other words, the value Z of the additional impedance is preferably selected larger than the value $Z_{Th}$ of the sensor internal impedance 26.

For sensors sensitive to a physical quantity only through the impedance $Z_{Th}$ with a sensitivity z such as $dZ_{Th} = zdX$ and $dE_{Th} = 0$, the circuit is advantageous, in particular when the following condition is satisfied: $|(V_{so} - E_{Th}) \cdot (Z/Z_{Th}^2)| > 1$.

Figure 3:
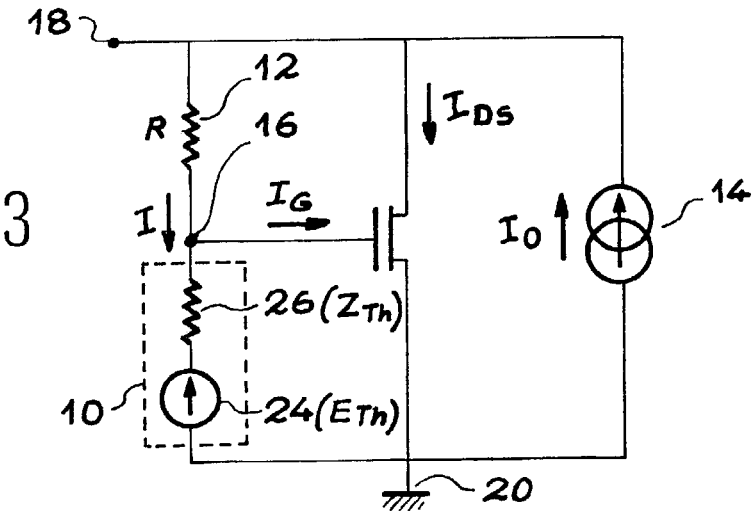

FIG. 3 illustrates the measuring system of FIG. 2 adapted to a thermal sensor of the kind of thermocouples.

The thermocouples involve the Seebeck effect. This effect relates the variations of temperature T to thermoelectric voltage variations. The impedance of a thermocouple is noticeably constant.

So, the thermocouple may be modelled as shown in FIG. 3, by a variable voltage source 24 whose voltage value is $E_{Th}$, in series with a merely resistive impedance 26, whose value is $R_{Th}$.

In this example, it is advisable to select an additional impedance 12 purely resistive, whose value is R.

In the case when transistor 22 is a N channel MOS type featuring a threshold voltage Vt, the optimal operation is obtain when the following relations are satisfied:

$I_G \ll I \ll I_0$ $0 < V_T < V_{GSo} < V_{DS}$ $E_{Th} < V_{GSo}$ $R/R_{Th} > 1$

By assuming that $V_{DS}$ is the output voltage, the sensitivity in temperature measurement $dV_{DS}/dT$ is amplified and becomes $|dV_{DS}/dT| = (R/R_{Th})a$ where a is the intrinsic thermocouple sensitivity.

FIG. 4 shows another example of application of the invention wherein the sensor 10 is a dosimeter, i.e., a sensor which is sensitive to radiation. Such a component for example features a MOS type (Metal-Oxide-Semiconductor) capacitor. The radiation level is measured through the variation of an electrical potential $V_{Fb}$ said flat band potential. Sensor 10 may be modelled as a variable voltage source 24, value $E_{Th}$, whose constant sensitivity is e, in series with a purely capacitor impedance, value $C_{Th}$.

In the example of FIG. 4, the additional impedance 12 is also selected as a pure capacitor, of value C. Transistor 22 is a P channel MOS type transistor with a threshold voltage $V_T$. It must be noted that, in this case, the flow $I_0$ is inverted, with respect to the previous figures, which corresponds to the use of N channel transistors.

In this example, the circuit operates optimally with components selected for satisfying the following relations.

$I_G \ll I \ll I_0$ $V_{DS} < V_{GSo} < V_T < 0$ $V_{GSo} < E_{Th}$ $C_{Th}/C > 1$

By forcing the linearity of the MOS capacitor and thus defining its intrinsic sensitivity as s, the sensitivity of radiation dose measurements D, noted $dV_{DS}/dD$ expresses as:

$dV_{DS}/dD = (C_{Th}/C) \cdot s$

FIG. 5 shows a third example wherein sensor 10 is a field effect ion-sensitive capacitor (ISFEC). Such sensors are used for pH-measurement. Measuring the ph of a solution is performed by the variation of an electrical potential onto an insulating/electrolytic interface.

The ISFEC-type sensors may be modelled as a variable voltage source 24, value $E_{Th}$, whose sensitivity is s, in series with an impedance which is a MOS-type capacitor 26a, of constant value $C_{Th}$, in series with a resistor 26b, whose value is $R_S$. This resistive value comes from the series resistance of the electrolyte and a sensor reference electrode.

One may see on the figure that the additional impedance 12 includes a capacitive value C, a capacitor 12a in parallel with a resistive value R, a resistor 12b.

It is also shown that a resistor 28, whose value is $R_P$, is connected in parallel to the load between node 16 and ground terminal 20.

High values leak resistances result from the current leaks of the MOS capacitor 26a and from the gate-source capacitor of transistor 22. The resistors 12b and 28, which prove lower values, create a dividing bridge and allow to neglect these leak resistances, whose value is difficult to evaluate. They then make it possible to control leak currents.

The amplification of pH detection capabilities obtained in the bridge including sensor 10 and capacitor 12a is however altered by the value of the series resistor, value $R_S$, and the effects of the bridge including the resistors 12b–28.

Transistor 22 is a P channel type transistor with a threshold voltage $V_T$.

For optimal operation of the circuit, the components are selected so as to satisfy the following relations:

$I_G \ll I \ll I_0$ $V_{DS} < V_{GSo} > V_T < 0$ $V_{GSo} < E_{Th}$ $C_{Th}/C < 1$ $C_{Th}/C < R/R_P$

Figure 6:
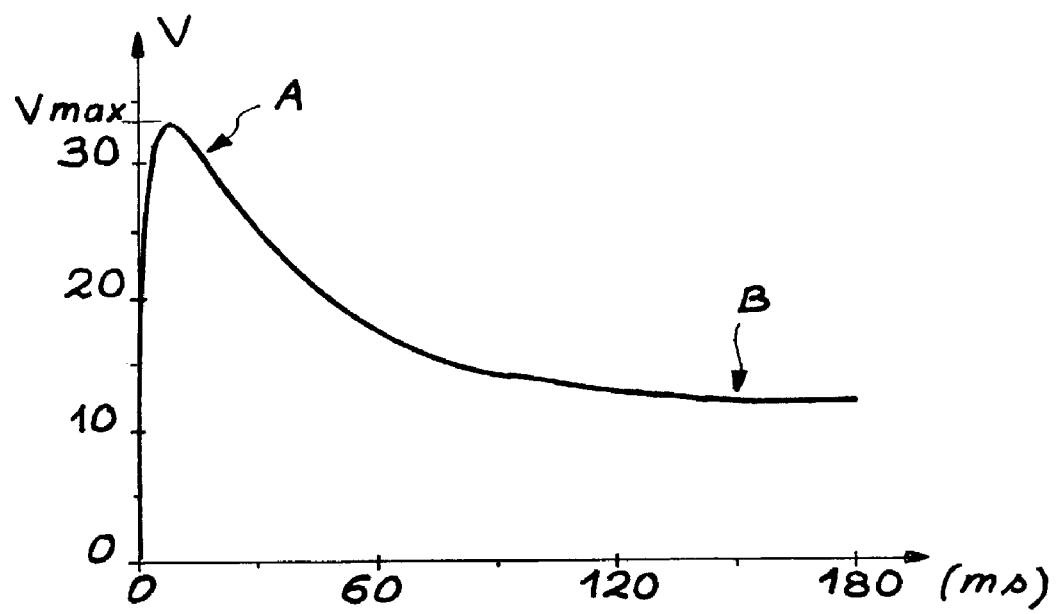
FIG. 6 is a plot of the evolution in time of the output voltage of a measuring system following the invention, including a sensor sensitive to hydrogen.

The voltage $V_{DS}$ produced by the circuit in FIG. 5 evolves in time. It shows first a transient phase A due to the effect of the bridge 10, 12a sensor/capacitor then a steady state B due to the effect of the resistive bridge 28, 12b. These phases appear in FIG. 6. This figure plots the voltage $V_{DS}$ in ordinate, in volts, versus time in abscissa, in milliseconds.

The maximum value of $V_{DS}$, namely $V_{max}$, is thus representative of the amplification of detection properties. The hydrogen potential measurement sensitivity is brought up to the value:

$\cdot dV_{max}/dpH \cdot = \alpha(C_{Th}/C) \cdot s$

The ratio $C_{Th}/C$ represents the amplification of the capacitive bridge whereas coefficient $\alpha$ represents the amplification attenuation due to the resistive bridge (R, $R_P$) and series resistor $R_s$ ($\alpha < 1$).

Figure 7:
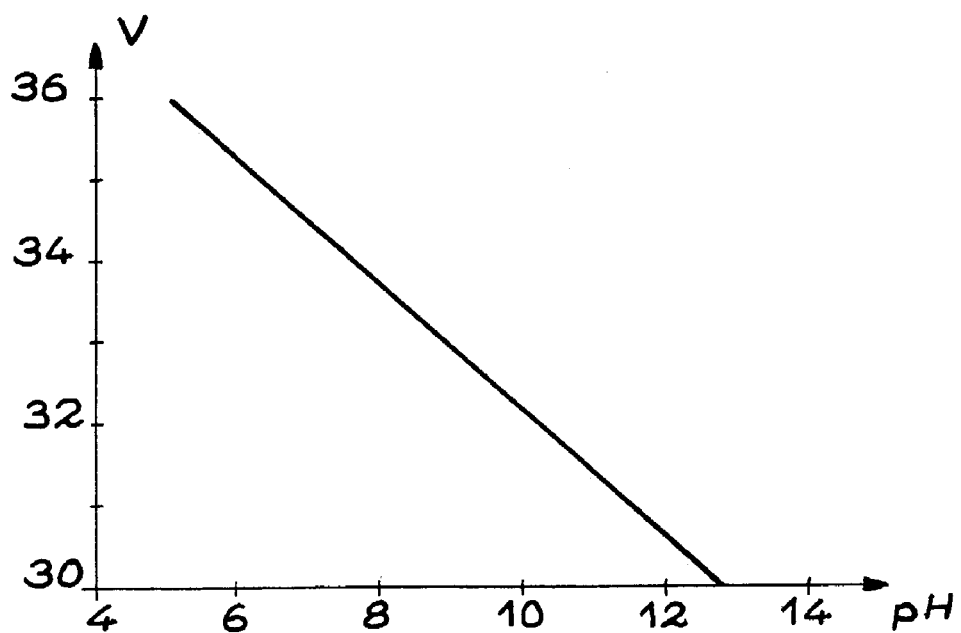
FIG. 7 is a plot showing the maximum of the output voltage of the said measuring system in terms of hydrogen potentials measured in a solution.

On the whole, and over a wide scale of pH values, the invention brings up an increase of the sensitivity to pH measurements up to values much larger than the theoretical maximum (Nernst law: s=59 mv/pH at ambient temperature) currently obtained when using standard techniques. This appears in FIG. 7 which plots in ordinate, in volts, the $V_{max}$ voltages measured with the system of FIG. 5, versus the pH values in abscissa.

What is claimed is:

1. A physical quantity measuring system, comprising:
   an MOS dosimeter sensor equivalent to a variable voltage source (24) whose value is $E_{Th}$, proving a purely capacitive impedance (26) whose value is $C_{Th}$, wherein the additional impedance (12) proves a capacitive impedance C and wherein the following relations are satisfied:

$I_G < I < I_0$ $V_{DS} < V_{GSo} < V_T < 0$ $V_{GSo} < E_{Th}$ $C_{Th}/C > 1$ where $V_T$, $I_G$, $I_0$, $V_{DS}$, $V_{GSo}$ and I respectively are a threshold voltage of a P channel field effect transistor used as a voltage control means, a gate current of the transistor, a polarization current of the transistor, a drain-source voltage of the transistor, an equilibrium gate-source voltage of the transistor and a current flowing in the sensor; and
   an amplifying device for said sensor, said amplifying device including:
   voltage control means (22) connected to output terminals (16, 20) of the sensor to maintain between said terminals a noticeably constant voltage;
   at least one additional impedance (12) series connected with the sensor in a polarization circuit between output terminals (18, 20) of said device, such that a same current flows into the sensor and into the additional impedance; and
   polarization means (14) providing the sensor and the additional impedance with said same current (I).

2. A device according to claim 1, wherein said voltage control means (22) includes a field effect transistor with a gate, a source and a drain, wherein the sensor (10) is connected between the gate and the source of the transistor and wherein the additional impedance (12) is connected between the gate and the drain of the transistor.

3. A device according to claim 2 wherein the transistor is of MOS type (Metal-Oxide-Semiconductor).

4. A device according to claim 2, wherein the polarization means (14) polarize the transistor in saturation.

5. A device according to claim 4, wherein the polarization means (14) include a current source connected to output terminals (18, 20) and between the source and drain of the transistor (22).

* * * * *